Patented June 18, 1940

2,205,276

UNITED STATES PATENT OFFICE 2,205,276

ABRASIVE ARTICLE

Norman P. Robie, Niagara Falls, N. Y., assignor to The Carborundum Company, Niagara Falls, N. Y., a corporation of Delaware No Drawing. Application February 11, 1937,
Serial No. 125,285

8 Claims. (Cl. 51—280)

This invention relates to improved abrasive articles and particularly to abrasive articles wherein there is employed a binder consisting essentially of a particular type of polymerized vinyl compound.

This application is a continuation in part of my copending application Serial No. 746,849, filed October 4, 1934.

Bonded abrasive articles as represented by abrasive wheels have commonly been made by preparing a mixture of abrasive grains with pulverized bonding agents, molding articles from such a mixture and then heating them to harden the binder. Such articles are made with a variety of bonds including certain classes of synthetic resins such as well-known phenol aldehyde condensation products and the glyceryl phthalate products, as well as with natural resins such as shellac. Abrasive products bonded with these materials have been widely used and it is a recognized fact that different bonds impart different grinding characteristics to abrasive articles so that such articles are particularly well adapted for some particular purpose.

I have found that abrasive articles bonded with a certain class of vinyl resins which I will later describe in detail are particularly well adapted for certain purposes such as the cutting of stone and the snagging of rough castings. I have also found that these resins are especially well suited for the manufacture of coated abrasives such as are typified by what is commonly known as "sandpaper."

It is accordingly an object of the invention to provide improved abrasive articles such as abrasive wheels and stones and abrasive coated products such as sandpaper.

Another object of the invention is to provide abrasive articles employing a particular vinyl resin as a binder.

Another object of the invention is to provide an abrasive wheel bonded with a particular vinyl resin which is especially well adapted for stone cutting. Other objects of the invention will appear from a consideration of the following description of the invention.

Vinyl resins have been made by polymerizing certain vinyl compounds such as vinyl acetate or vinyl chloride which are characterized by the inclusion of the vinyl group $CH_2=CH$. It is well-known that monomeric compounds containing different vinyl groups are readily polymerized to form plastic materials which are of a generally resinous character. These resins are permanently thermoplastic, by which is meant that the resins may be repeatedly heated and cooled without alteration of the softening point, in contrast to the well-known phenolic or glyceryl condensation products which are of a heat-hardening character.

If monomeric vinyl chloride or vinyl acetate is heated under suitable conditions and particularly in the presence of suitable catalysts, the double bond of the vinyl group is said to open up and join the monomeric molecules to form chains containing a number of the monomeric molecules, the number appearing in any one chain being dependent upon the reacting conditions employed to bring about the polymerization. The polymers which contain a comparatively small number of monomeric molecules are usually of low melting point and form solutions of a relatively low viscosity, while as the number of monomers in any polymer is increased, the softening point of the product and the viscosity of the solutions of the product are also increased.

The most common vinyl resins are polymerized vinyl acetate and polymerized vinyl chloride. These products are available commercially in various degrees of polymerization with corresponding softening points, but in general the polymer of either of these products is of relatively low softening point.

The particular vinyl resins which I have found to be especially well suited for use in the manufacture of abrasive articles consist of a chemically modified polymer of a vinyl ester of a lower fatty acid, specifically polymerized vinyl acetate, although polymers of other vinyl compounds of this class, such as the butyrate may also be employed. I have used a modification of polymerized vinyl acetate particularly because the acetate is readily available commercially.

The modified polymerized vinyl compounds is the aldehyde condensation product of a hydrolyzed or partially hydrolyzed polymerized vinyl ester compound. Specifically, polymerized vinyl acetate can be modified by suitable chemical processes to form an acetal or a partial acetal of the polymerized vinyl ester. For example, polymerized vinyl acetate may be reacted with an aldehyde such as acetaldehyde or formaldehyde in such a way that two of the acetate groups of the polymer will be removed from the long chain of polymeric molecules and replaced by the aldehyde with a simultaneous formation of water.

The properties of the acetal type of vinyl resin depend primarily upon two factors; namely, the length of the polymer of the fatty acid which is reacted with the aldehyde and the proportion of the fatty acid groups which are replaced by aldehydes.

A method which is commonly used for designating the degree of reaction of a vinyl polymer such as polyvinyl acetate consists in dissolving the resinous material in benzol in proportions to form a molar solution and then measuring the viscosity of that solution in centipoises at 20° C. The resin is then designated by the number of centipoises so measured. While resins of various degrees of polymerization may be used in forming the acetals employed in my invention, generally speaking, I prefer to use resins which have been polymerized to such an extent that the viscosity of the solutions as just described is in the order of from 10–30, and one resin which I have found to be very satisfactory was made by modifying a polyvinyl acetate, the molar benzol solution of which had a viscosity of 15 centipoises at 15° C.

The extent to which the fatty acid polymer is reacted with the aldehyde may be varied up to about as high as 95% and as I have stated, the properties of the product obtained by reacting any particular polymer depend upon the degree of replacement of the fatty acid group by the polymerized ester by the aldehyde. Generally speaking, I have found that acetals in which the fatty acid has been replaced to an extent from 50–90% are satisfactory for use in abrasive articles and specifically a resin formed by reacting 70% of the acetate group of polymerized vinyl ester having a viscosity of 15 centipoises with acetaldehyde has been found to be particularly well suited for making abrasive wheels for various purposes and particularly for cutting stone such as sandstone. These partially reacted resins are herein referred to generically as "partial acetals."

Bonded abrasive articles may be made with these resins by any of the methods commonly used in making resin bonded abrasives. For example, the abrasive grains may be mixed with a solution of the resin in a volatile solvent to get a distribution of the resin about the grains and the solvent may be evaporated to deposit the solid resin about the grains. Alternatively, the grains may be moistened with a high boiling solvent, such as, for example, benzaldehyde, and the moistened grains then mixed with a solubilized resin to obtain a distribution of the powdered resin about the grains. Benzaldehyde is a relatively poor solvent for these resins and I have sometimes found it convenient to allow mixtures made in this manner to stand for some time to permit the aldehyde to soak through the coating of powdered resin and thus attach it more firmly to the individual grains. I have also prepared abrasive articles by first heating the abrasive grains and the resin together to distribute the resin about the grains and cause it to become attached to them. In some cases I have merely mixed the grain with the powdered resin, especially where the grain was of relatively fine grit.

Having prepared a mixture of the grain and resin by any of the methods just described, a molded article can be formed by distributing the mixture uniformly in a suitable mold, pressing the mold and its contents to shape the mixture into an article and removing the article from the mold. As is well-known, the articles may be pressed in a cold mold or they may be put into a mold provided with heated platens such as are commonly used in the manufacture of abrasive articles.

While the resins which I use are not heat-reactive in the sense that phenolic condensation products are chemically converted by the prolonged application of heat, I have usually found it desirable to bake the formed articles as, for example, by putting them in an oven having an initial temperature of around 125° F. and gradually raising the temperature up to about 350° F. Where a solvent is used in making up the mixture it is advisable to leave the articles in the oven at a temperature of around 150–200° F. for a rather long time such as overnight, in order to prevent any bloating of the resin by the rapid evaporation of the solvent. In some instances I have also found it to be desirable to incorporate into the mix a small proportion of a metal chloride such as iron, bismuth or tin chloride, in amounts corresponding to a few per cent of the resin, as a catalyst or reactant to promote a hardening of the resin during the heat treatment.

In making abrasive coated objects such as are commonly referred to as "sandpaper" I have found it convenient to dissolve the resin in a suitable solvent and employ it in the manner commonly used in making sandpaper with glue, merely substituting the solution of resin for the glue. After the solution of resin and the abrasive grains have been applied to the backing, the thus-prepared article is subjected to a heat treatment to remove the solvent and flux the deposited resin so as to cause a firm adhesion of the resin to the abrasive grains and to the backing. Alternatively, the resin may be dispersed in a non-solvent, such as water, by methods which are well known in the art.

These resins have also been found to be especially well suited for attaching abrasive grains to the periphery of yieldable wheels in the preparation of the well-known "setup" wheels.

While abrasive articles prepared in accordance with my invention are adapted for many purposes I have found that rigid bonded wheels made with these resins are especially well adapted to cutting stone, such as sandstone. Heretofore, wheels bonded with shellac have frequently been used for this purpose. I have found that wheels made according to my invention are superior to shellac bonded wheels for this purpose. The shellac bonded wheels require frequent dressing to keep them open enough so that they cut at a reasonable commercial rate, whereas wheels made by my invention appear to have something of a self-dressing action and require very little, if any, dressing. I have also used wheels made in accordance with my invention for snagging steel billets to smooth them out preparatory to rolling.

Sandpaper made with these resins has been found to be superior to glue in many respects and specifically for use in making belts such as are employed in furniture factories for smoothing wood.

As I have stated, abrasive articles may be made by any of the methods commonly used in the abrasive art in making resin bonded abrasive products. Likewise, other modifications common to the abrasive art, such as the inclusion of inert fillers, the addition of plasticizers to increase the flexibility of the binder and mixtures of the resins with other compatible binders may be used, and, in general, the invention is adapted to the modifications common in the abrasive art. Accordingly, the invention is not to be considered as limited to the methods, compositions and uses herein disclosed in describing typical exemplifications, but rather is to be considered as having the scope of the appended claims.

I claim:

1. An abrasive article comprising abrasive grains and a bond comprising a partial acetal of a polymerized vinyl ester.

2. An abrasive article comprising abrasive grains and a bond comprising a partial acetal of polymerized vinyl acetate.

3. An abrasive article comprising abrasive grains and a bond comprising the acetaldehyde partial acetal of polymerized vinyl acetate.

4. An abrasive article comprising abrasive grains and a bond comprising a partial acetal of polyvinyl acetate in which from 50 to 90 percent of the acetate groups of a polyvinyl acetate have been replaced by hydrolysis and subsequent reaction with an aldehyde.

5. An abrasive article comprising abrasive grains and a bond comprising the partial acetal of polyvinyl acetate in which approximately 70 percent of the acetate groups of a polyvinyl acetate have been replaced by hydrolysis and subsequent reaction with acetaldehyde.

6. An abrasive article comprising abrasive grains and a bond comprising the formaldehyde partial acetal of polymerized vinyl acetate.

7. An abrasive article comprising abrasive grains and a bond comprising the acetaldehyde partial acetal of a polymerized vinyl ester.

8. An abrasive article comprising abrasive grains and a bond comprising the formaldehyde partial acetal of a polymerized vinyl ester.

NORMAN P. ROBIE.